United States Patent
Avanes et al.

(10) Patent No.: US 11,494,513 B2
(45) Date of Patent: *Nov. 8, 2022

(54) ROW-LEVEL SECURITY

(71) Applicant: Snowflake Inc., Bozeman, MT (US)

(72) Inventors: Artin Avanes, Palo Alto, CA (US); Khalid Zaman Bijon, Santa Cruz, CA (US); Zheng Mi, Palo Alto, CA (US); Subramanian Muralidhar, Mercer Island, WA (US); David Schultz, Piedmont, CA (US); Jian Xu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,089

(22) Filed: Apr. 28, 2022

(65) Prior Publication Data

US 2022/0253547 A1    Aug. 11, 2022

Related U.S. Application Data

(63) Continuation of application No. 17/083,732, filed on Oct. 29, 2020.

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 21/62* (2013.01); *G06F 21/6218* (2013.01); *G06F 2221/2141* (2013.01)

(58) Field of Classification Search
CPC .. G06F 21/6227; G06F 21/6218; G06F 21/62; G06F 21/604; G06F 2221/2141; G06F 16/2282
See application file for complete search history.

(56) References Cited

U.S. PATENT DOCUMENTS

| 6,405,212 B1 | 6/2002 | Samu et al. |
| 7,333,980 B2 | 2/2008 | Bjornson et al. |
| 7,370,050 B2 * | 5/2008 | Hunter ................ G06F 21/6227 707/999.009 |

(Continued)

FOREIGN PATENT DOCUMENTS

WO    WO-2022/093336 A1    5/2022

OTHER PUBLICATIONS

A. Al-Haj and B. Aziz, "Enforcing Multilevel Security Policies in Database-Defined Networks using Row-Level Security," 2019 International Conference on Networked Systems (NetSys), 2019, pp. 1-6. (Year: 2019).*

(Continued)

*Primary Examiner* — Kari L Schmidt
(74) *Attorney, Agent, or Firm* — Schwegman Lundberg & Woessner, P.A.

(57) ABSTRACT

Row-level security (RLS) may provide fine-grained access control based on flexible, user-defined access policies to databases, tables, objects, and other data structures. A RLS policy may be an entity or object that defines rules for row access. A RLS policy may be decoupled or independent from any specific table. This allows more robust and flexible control. A RLS policy may then be attached to one or more tables. The RLS policy may include a Boolean-valued expression.

21 Claims, 6 Drawing Sheets

(56) References Cited

U.S. PATENT DOCUMENTS

| | | | |
|---|---|---|---|
| 7,711,750 | B1 | 5/2010 | Dutta et al. |
| 8,306,999 | B2 | 11/2012 | Gass, III et al. |
| 8,682,912 | B2 | 3/2014 | Fish et al. |
| 8,914,844 | B2 | 12/2014 | Azagury et al. |
| 9,852,206 | B2* | 12/2017 | Muller ............... G06F 21/6227 |
| 10,120,938 | B2 | 11/2018 | Relkin et al. |
| 10,438,008 | B2 | 10/2019 | Antonopoulos et al. |
| 2004/0044655 | A1 | 3/2004 | Cotner et al. |
| 2005/0177570 | A1* | 8/2005 | Dutta ................. G06F 21/6227 707/999.009 |
| 2005/0262087 | A1* | 11/2005 | Wu ....................... G06F 16/21 707/999.009 |
| 2005/0289342 | A1 | 12/2005 | Needham et al. |
| 2006/0059567 | A1 | 3/2006 | Bird et al. |
| 2006/0195449 | A1 | 8/2006 | Hunter et al. |
| 2007/0208755 | A1 | 9/2007 | Bhatkar et al. |
| 2008/0313134 | A1 | 12/2008 | Lei |
| 2009/0094193 | A1 | 4/2009 | King et al. |
| 2009/0199273 | A1 | 8/2009 | Yalamanchi |
| 2010/0070763 | A1 | 3/2010 | Munday |
| 2011/0191751 | A1 | 8/2011 | Munday et al. |
| 2012/0209884 | A1 | 8/2012 | Mattsson et al. |
| 2014/0280345 | A1 | 9/2014 | Cras et al. |
| 2016/0104002 | A1 | 4/2016 | Schneider et al. |
| 2016/0125189 | A1 | 5/2016 | Antonopoulos et al. |
| 2019/0303405 | A1 | 10/2019 | Kothari et al. |
| 2020/0265026 | A1 | 8/2020 | Gruszecki et al. |
| 2020/0272750 | A1 | 8/2020 | Hoeffer et al. |
| 2020/0032021 | A1 | 10/2020 | Gruszecki et al. |
| 2022/0138342 | A1 | 5/2022 | Avanes et al. |

OTHER PUBLICATIONS

Xue, Tao et al. GuardSpark++: Fine-Grained Purpose-Aware Access Control for Secure Data Sharing and Analysis in Spark. In Annual Computer Security Applications Conference (ACSAC '20). Association for Computing Machinery, New York, NY, USA, 2020, pp. 582-596 (Year: 2020).*

Clifton, Chris et al. Privacy-preserving data integration and sharing. In Proceedings of the 9th ACM SIGMOD workshop on Research issues in data mining and knowledge discovery (DMKD '04). Association for Computing Machinery, New York, NY, USA, 2004, pp. 19-26. (Year: 2004).*

U.S. Appl. No. 17/083,732, filed Oct. 29, 2020, Row-Level Security.

"11. Implementing Row Level Security, Teradata Database Security Administration", [online]. Retrieved from the Internet: <URL: http://download.boulder.ibm.com/ibmdl/pub/software/data/db2/zos/family/v10pdfs/db2z_10_introbook.pdf?view=kc>, (2016), 40 pgs.

"5.7. Row Security Policies, PostgreSQL 9.5.25 Documentation", (Feb. 10, 2022), 6 pgs.

"7. Using Oracle Virtual Private Database to Control Data Access. Oracle Database Security Guide", [online]. [retrieved Mar. 21, 2022]. Retrieved from the Internet: <URL: https://docs.oracle.com/cd/B28359_01/network.111/b28531/vpd.htm#DBSEG007>, (2022), 41 pgs.

"8.1.3 Analytic Privileges, SAP HANA Security Guide", (c) 2018 SAP SE [online]. Retrieved from the Internet: <URL: https://help.sap.com/viewer/b3ee5778bc2e4a089d3299b82ec762a7/2.0.03/en-US/db08ea0cbb571014a386f851122958b2.html>, (2018), 22 pgs.

"U.S. Appl. No. 17/083,732, Final Office Action dated Apr. 1, 2021", 27 pgs.

"U.S. Appl. No. 17/083,732, Final Office Action dated Nov. 16, 2021", 29 pgs.

"U.S. Appl. No. 17/083,732, Non-Final Office Action dated Jul. 16, 2021", 29 pgs.

"U.S. Appl. No. 17/083,732, Non-Final Office Action dated Dec. 18, 2020", 23 pgs.

"U.S. Appl. No. 17/083,732, Notice of Allowance dated Apr. 12, 2022", 18 pgs.

"U.S. Appl. No. 17/083,732, Response filed Feb. 24, 2022 to Final Office Action dated Nov. 16, 2021", 9 pgs.

"U.S. Appl. No. 17/083,732, Response filed Mar. 18, 2021 to Non-Final Office Action dated Dec. 18, 2020", 12 pgs.

"U.S. Appl. No. 17/083,732, Response filed Jun. 30, 2021 to Final Office Action dated Apr. 1, 2021", 12 pgs.

"U.S. Appl. No. 17/083,732, Response filed Oct. 15, 2021 to Non-Final Office Action dated Jul. 16, 2021", 12 pgs.

"Create Policy, PostgreSQL 9.5.25 Documentation", [online]. [retrieved Mar. 21, 2022]. Retrieved from the Internet: <URL: https://www.postgresql.org/docs/9.5/ sql-createpolicy.html>, (Feb. 10, 2022), 4 pgs.

"Create Security Policy (Transact-SQL), SQL Server 2019", [online]. [archived May 6, 2021]. Retrieved from the Internet: <URL: https://web.archive.org/web/20210506165653/https:/docs.microsoft.com/en-us/sql/t-sql/statements/create-security-policy-transact-sql?view=sql-server-ver15>, (Aug. 10, 2017), 5 pgs.

"Create View, Database Developer Guide, Amazon Redshift", [online]. [archived Oct. 11, 2020]. Retrieved from the Internet: <URL: https://web.archive.org/web/20201011225918/https:/docs.aws.amazon.com/redshift/latest/dg/r_CREATE_VIEW.html>, (2020), 3 pgs.

"Create View, Databricks Documentation", © 2020 Databricks [online]. Retrieved from the Internet: <URL: https://web.archive.org/web/20201026131147/https:/docs.databricks.com/spark/latest/spark-sql/language-manual/sql-ref-syntax-ddl-create-view.html>, (2020), 3 pgs.

"Creating Authorized Views. BigQuery, Data Analytics Products", [online]. [archived May 25, 2020]. Retrieved from the Internet: <URL: https://web.archive.org/web/20200525021010/https:/cloud.google.com/bigquery/docs/authorized-views, (2020), 5 pgs.

"International Application Serial No. PCT/US2021/039661, International Search Report dated Jul. 23, 2021", 2 pgs.

"International Application Serial No. PCT/US2021/039661, Written Opinion dated Jul. 23, 2021", 8 pgs.

"Introduction to DB2 for z/OS", © IBM [online}. Retrieved from the Internet: <URL: http://download.boulder.ibm.com/ibmdl/pub/software/data/db2/zos/family/v10pdfs/db2z_10_introbook.pdf?view=kc>, (2017), 489 pgs.

"Row-Level Security", [online]. [archived Jun. 23, 2020]. Retrieved from the Internet: <URL: https://web.archive.org/web/20200623005820/https:/docs.microsoft.com/en-us/sql/relational-databases/security/row-level-security?view=sql-server-ver15>, (May 14, 2019), 17 pgs.

Marzoev, Alana, et al., "Towards multiverse databases", *Proceedings of the Workshop on Hot Topics in Operating System*, (2019), 8 pgs.

Sarfraz, Muhammad I, et al., "Dbmask: Fine-grained access control on encrypted relational databases", *Proceedings of the 5th ACM Conference on Data and Application Security and Privacy*, (2015), 12 pgs.

Shi, Jie, et al., "Analyzing and Controlling Information Inference of Fine-Grained Access Control Policies in Relational Databases", *2013 Fourth International Conference on Emerging Intelligent Data and Web Technologies*, (2013), 385-392.

* cited by examiner

ROW-LEVEL SECURITY

CROSS-REFERENCE TO RELATED APPLICATION

This application is a Continuation of U.S. patent application Ser. No. 17/083,732 filed Oct. 29, 2020, the contents of which are incorporated herein by reference in their entirety.

TECHNICAL FIELD

The present disclosure generally relates to row-level security for data structures, such as database tables.

BACKGROUND

Companies and other entities can load mixed data into tables, which can then be accessible by multiple users, such as different employees. However, the company may not want all the data in the table to be accessible by all users. The company may want to restrict some data from certain users. For example, a clinic with multiple doctors may store data of all of its patients in a common table but may want doctors to have access to the records of only their own patients and not patients of other doctors in the clinic.

One approach to restrict access to certain data is to use secure views with a where clause predicate. But using secure views to implement an access policy leads to manageability issues. For example, it can lead to managing numerous separate secure views, which is highly inefficient.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Row-level security (RLS) may provide fine-grained access control based on flexible, user-defined access policies to databases, tables, objects, and other data structures. A RLS policy, as described herein, may be an entity or object that defines rules for row access. A RLS policy may be defined in a way that it is decoupled or independent from any specific table. This allows more robust and flexible control. A RLS policy may then be attached to one or more tables. The RLS policy may include a Boolean-valued expression.

Figure 1:
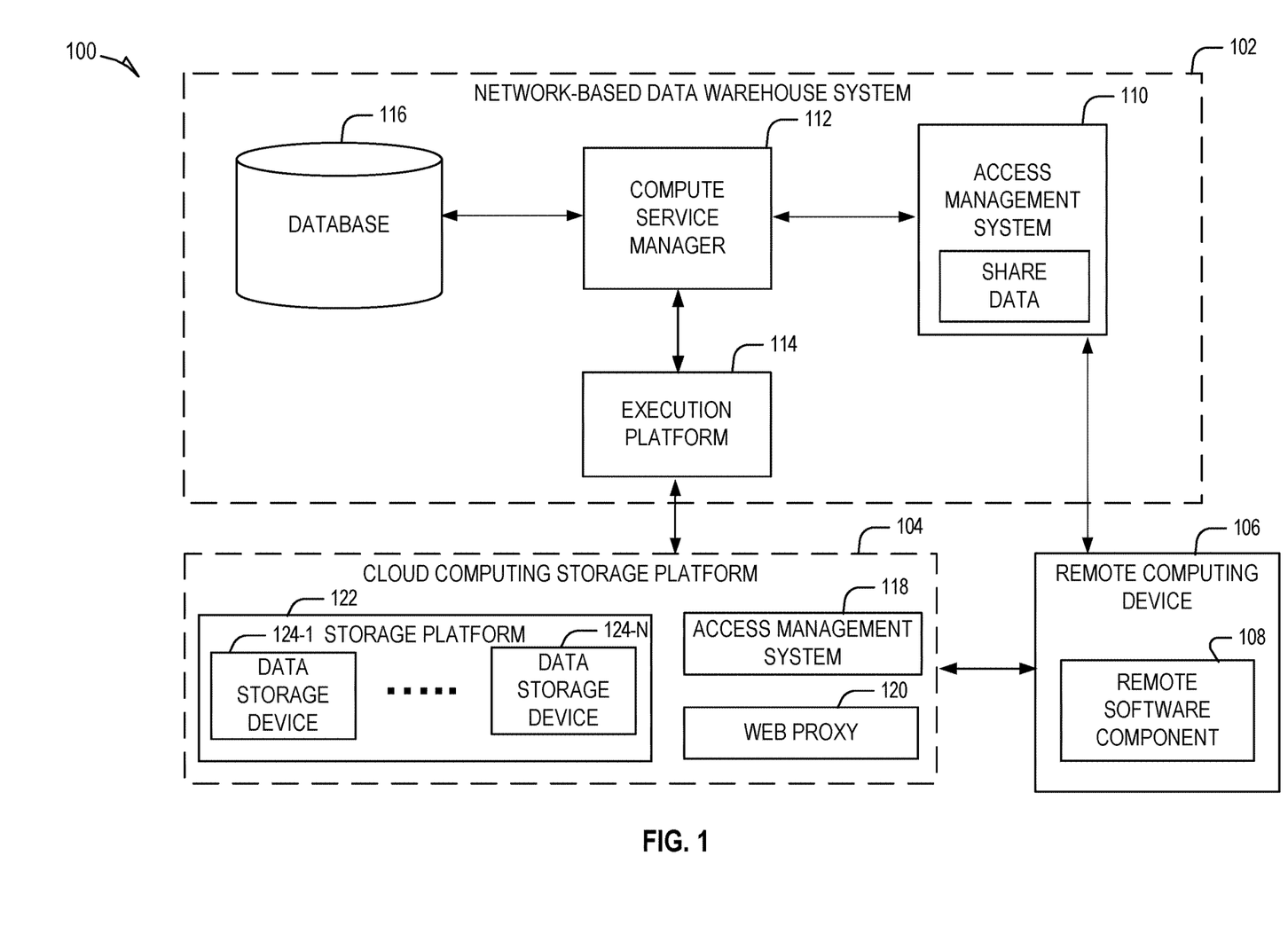
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Platform®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
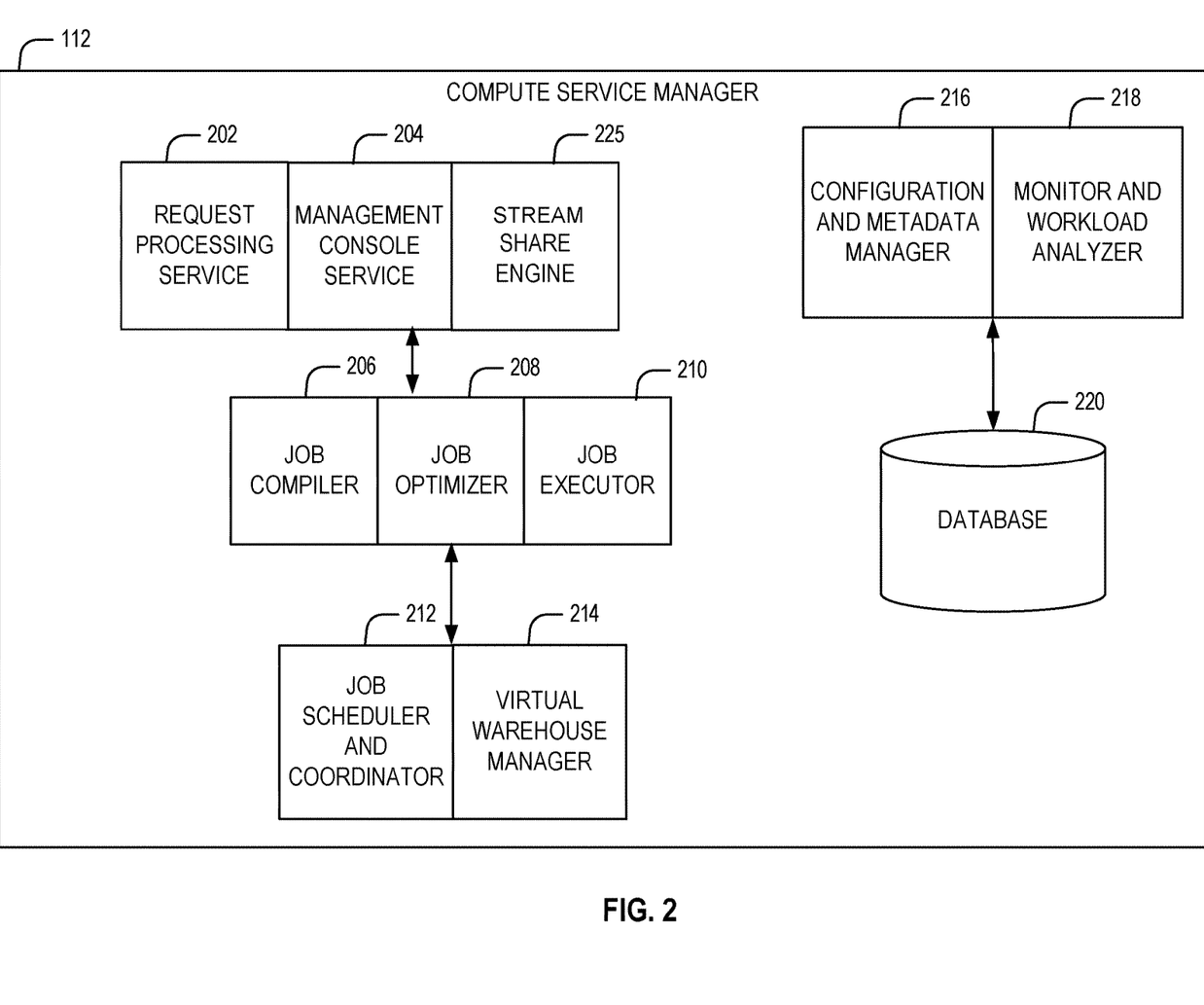
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
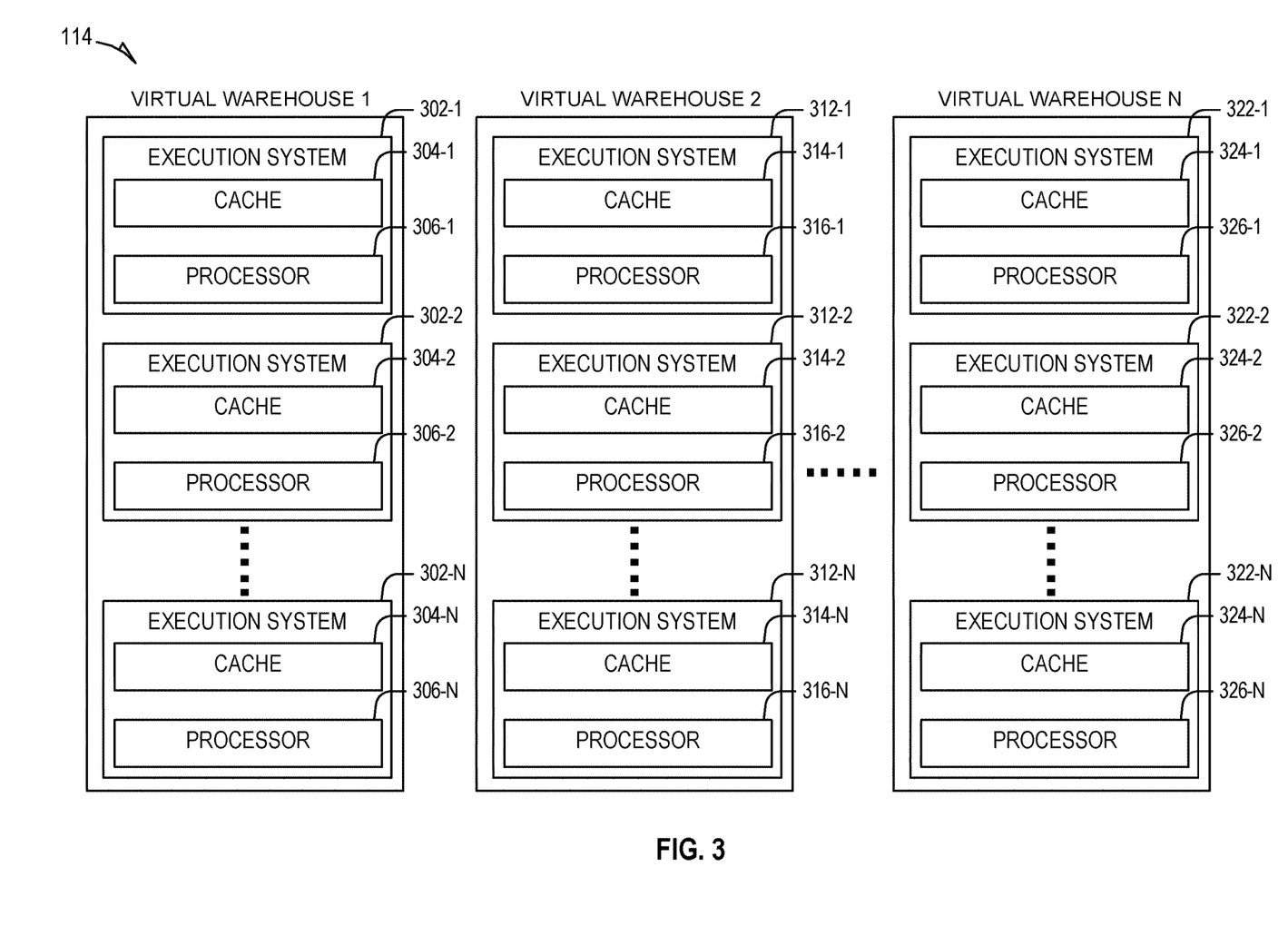
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Row-level security (RLS) may provide fine-grained access control based on flexible, user-defined access policies to tables, objects, views, streams, and other data structures. RLS policies, as described herein, may restrict what users can read from a database at the granularity of rows. RLS policies, as described herein, may be applied to tables and views (e.g., Materialized views).

Figure 4:
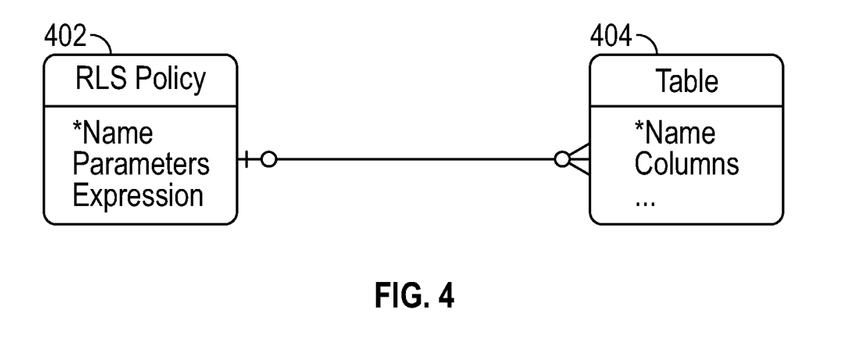
FIG. 4 shows a row-level security (RLS) policy data model, according to some example embodiments.

FIG. 4 shows a row-level security (RLS) policy data model, according to some example embodiments. The RLS data model may include a RLS policy 402 and at least one table 404. The RLS policy 402 may be provided as an entity or object that defines rules for row access. The RLS policy 402 may include a name, parameters, and an expression. The name may represent the name of the policy. The parameters may correspond to the criteria related to allowing or restricting access. An expression may be a Boolean-valued expression (e.g., SQL, Javascript). The expression may be provided as a SQL expression evaluating a policy condition where the result is Boolean as further described below. The expression may invoke user defined functions (UDFs) and external functions, have side-effects, and use subqueries. The RLS policy 402 may be decoupled or independent of any table. Thus, the RLS policy 402 may be enforced for one or more tables (e.g., table 404) by attaching the RLS policy 402 to the one or more tables, as described in further detail below.

In an embodiment, RLS policy definition and attachment may be performed using a centralized model. In a centralized model, one user (e.g., a policy administrator) may define an RLS policy and that same user may attach that RLS policy to one or more tables.

Figure 5:
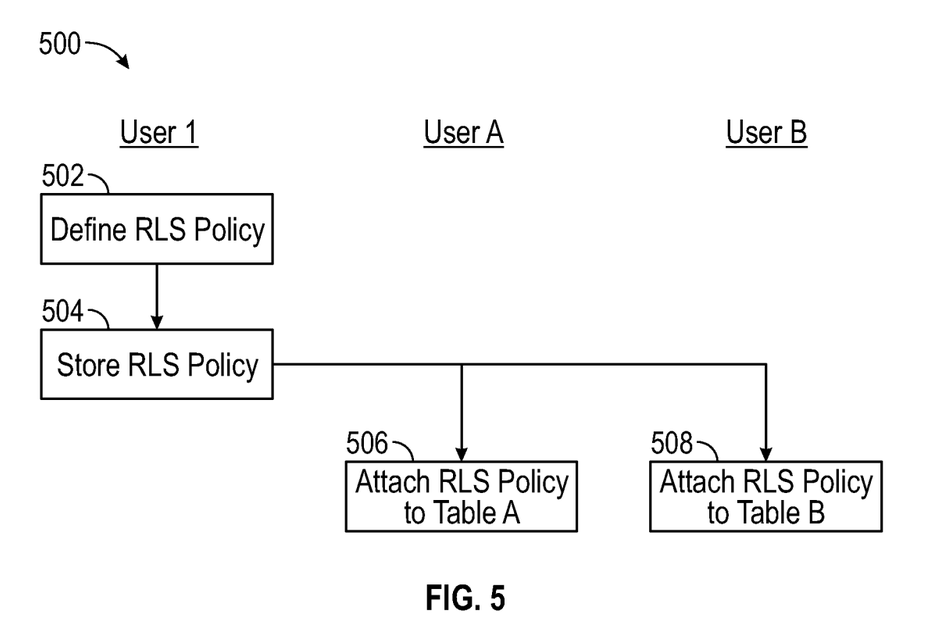
FIG. 5 shows a flow diagram a flow diagram of a method for defining and attaching a RLS policy, according to some example embodiments.

In another embodiment, a decentralized model may be used, with one set of users being responsible for defining an RLS policy and another set of users being responsible for attaching (and detaching) the RLS policy to one or more tables. FIG. 5 shows a flow diagram of a method 500 for defining and attaching a RLS policy, according to some example embodiments.

At operation 502, a user from a first set of users (e.g., User 1) may define a RLS policy as described above. The first set of users may correspond to users with a first role, e.g., role having security administrative rights. For example, User 1 may define a RLS policy using the following syntax:

```
CREATE ROW ACCESS POLICY <name> AS
(<arg name> <arg type> [, ... ]) RETURNS BOOLEAN
    ->
<expression>
[COMMENT='<string_literal>']
```

The RLS policy may be defined such that it is decoupled from any table or object (i.e., independent). The expression may be any Boolean-valued SQL expression. Having the expression be a Boolean-valued SQL expression provides advantages over alternatives such as expressing the RLS policy as a function that returns a SQL expression as a string, which is then effectively appended to the "where" clause on the table to which the policy applies. Expressing the RLS policy as a function that returns a SQL expression as a string can have several disadvantages. For example, that technique requires dynamically generating SQL, which cannot be compiled in advance and checked for errors so it cannot be easily optimized and query plans using it cannot be cached. That technique also involves unnecessary complexity because of additional layers of indirection. These disadvantages can be overcome by using a Boolean-valued SQL expression in the RLS policy, as described herein.

At operation 504, User 1 may store the RLS policy in a location accessible by other users. User 1 may also transfer ownership of the policy to a role mapping function. This may ensure that the policy expression is evaluated using the privileges of the role mapping function, as opposed to User 1's highly privileged role. User 1 may also grant permission for a second set of users to apply the RLS policy.

After the RLS policy is defined, it may be attached to one or more tables. At operation 506, a second user, User A, from a second set of users may retrieve the RLS policy and attach or assign the RLS policy to table A. The second set of users may correspond to users with a second type of role, e.g., content owners such as table owners. To attach the RLS policy to table A, User A may have ownership privilege on Table A and apply that privilege on the RLS policy object. Alternatively, User A may have privilege to apply a row access policy on table A. For example, User A may attach the RLS policy using the following syntax:

```
ALTER [[EXTERNAL] TABLE | [MATERIALIZED]
    VIEW] [IF EXISTS]<name>
ADDROW ACCESS POLICY <policy_name> ON
(<column>[, ... ])
```

User A may designate for which one or more columns in table A the RLS policy is applicable. Attaching the RLS may fail if the attachment would create a circular dependency. For example, attaching the RLS policy may fail if the policy directly or indirectly (e.g., via UDFs or views) refers to the table to which it is applied (Table A, in this example).

As mentioned above, the RLS policy may be attached to one or more tables. At operation 508, a third user, User B, from the second set of users may retrieve the RLS policy and attach or assign the RLS policy to another table, table B. The second set of users may correspond to content owners such as table owners. To attach the RLS policy to table B, User B may have ownership privilege on Table B and apply that privilege on the RLS policy object. Alternatively, User B may have privilege to apply a row access policy on table B. User B may designate for which one or more columns in table B the RLS policy is applicable. The name(s) of the applicable columns in table A for the RLS policy may be different than the name(s) of the applicable columns in table B, but the format of the information provided in those columns may be substantially the same. For example, in one table a column may be named "Zip Code" and in another table a column may be named "Postal Code"; both columns may include the same format (e.g., 5-digit numeric code). Therefore, if a table column is renamed, the policy association may be automatically updated.

Information regarding the attachment of the RLS policy may be stored such that examination of the inventory of available policies, the set of tables they are applied to, and the history of changes in those policies may be performed (e.g., also referred to as auditability). In an embodiment, a table may have only one RLS policy attached to it at a time, but the same RLS policy may be attached to multiple tables at the same time.

In another embodiment, multiple RLS policies may be attached to a table at a time. The RLS policies may act in a conjunctive manner where access to a row may be provided when all attached RLS policies allow access. Alternatively, the RLS policies may act in a disjunctive manner where access to a row may be provided if at least one attached RLS policy allows access.

The RLS policy may be detachable from a table. For example, a user (e.g., User A or B) may detach the RLS policy using the following syntax:

```
ALTER [[EXTERNAL] TABLE|[MATERIALIZED]
    VIEW] [IF EXISTS]<name>
DROP ROW ACCESS POLICY <policy_name>
```

To detach the RLS policy to a table, the user may have ownership privilege on the table (but unlike attaching a policy, the user may not need apply privilege on the policy). Alternatively, the user may have privilege to apply a row access policy on the table.

Figure 6:
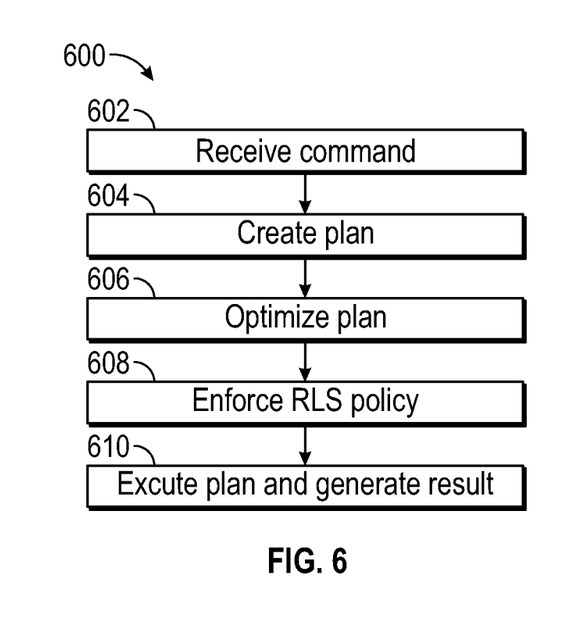
FIG. 6 shows a flow diagram of a method for executing a command using on a RLS-protected table, according to some example embodiments.

Next, procedures and operations of RLS policies are described. FIG. 6 shows a flow diagram of a method 600 for executing a command using on a RLS-protected table, according to some example embodiments. At operation 602, a command may be received. The command may be an instruction to insert, delete, modify, or the like. The command may also be a query. The command may include a request for one or more operations to be run on a data set, such as a source table. For example, the command may include a SQL string. At operation 604, in response to receiving the command, a plan may be created to execute the received command. For example, the SQL string may be parsed. The plan may include a plurality of operators and links connecting the operators.

At operation 606, the plan may be revised based on rule-based optimization. That is, the plan, which for example may be represented as a relational algebra tree, may be revised into a better form based on a set of rules. The rules may be directed to pruning or constant folding one or more operators based on predicate properties, predicate simplification, filter pushdown, eliminating unnecessary grouping or aggregation, subquery unnesting, and/or other suitable rules. At operation 608, the RLS policy attached to the source table may be enforced. The system may determine whether the execution of an operator from revised plan before enforcement of the RLS policy through execution of another operator would reveal information restricted by the RLS policy. If so, the RLS policy may prioritize RLS-based predicates (or operators) before other predicates (or operators) in the optimization. For example, the optimization may not apply any command or query operators before the RLS policy if doing so could result in an error channel. Error channels are a type of covert channel where the presence or absence of an error reveals information. For example, consider the following query:

SELECT 1/(42−secret) FROM tb1 WHERE user='Bob'

In this example, suppose an RLS policy may prevent the user issuing the query from seeing the row for 'Bob'.

However, if the division operator is performed before the RLS policy is enforced, a divide-by-zero error may expose Bob's secret if Bob's secret is 42. Thus, the optimization may not apply the division operator before enforcing the RLS policy because doing so could result in an error channel.

Moreover, the RLS policy may restrict aggregate functions that may reveal restricted content. For example, consider a "show tables" command, which may produce a list of tables for which the user has permissions along with the number of rows in each table or the number of bytes the table consumes or other aggregate information. For an RLS-protected table, the aggregate information would include the rows restricted from access by the user. Thus, for a RLS-protected table, the system may hide aggregate information, such as the number of rows, the number of bytes, etc., based on the RLS policy.

In addition to restricting access or viewing, the RLS policy may restrict operations on rows that cannot be accessed by a certain user as defined by the RLS policy. For example, the RLS policy may restrict a user from deleting rows that the user does not have access to as defined by the RLS policy. There may be exceptions for certain operations. For example, the RLS policy may allow a user to insert a row that the user cannot subsequently have access to based on the RLS policy. Consider a RLS policy where the user can only have access to rows of data associated with North America as the sales region (as identified by a column). The RLS policy may allow that user to add a row with a different associated sales region (e.g., Europe) than North America, but RLS policy may then restrict that user from accessing the added row after the addition.

As another example, the RLS policy may allow a user to update a row to which the user has access to in such a manner that that updated row is no longer accessible to the user based on the RLS policy. Again, consider a RLS policy where the user can only have access to rows of data associated with North America as the sales region (as identified by a column). The RLS policy may allow the user to modify a row, changing the sales region from North America to Europe, and the RLS policy may then, after the modification, may restrict the user from accessing that modified row.

In another example, the RLS policy may restrict a user from updating a subset of rows to which the user may have access. That is, the RLS policy may allow the user to update or delete or add a subset of rows from the set of rows for which the user has been given access. Thus, the RLS policy may have tiered access control for certain rows.

At operation 610, the plan may be executed and results of the command may be generated while enforcing the RLS policy, as described herein.

Other safeguards for preventing impermissible access to restricted data based on a defined RLS policy may be implemented. For example, when a user runs a query on a table protected by a RLS policy, the policy expression may be evaluated using the permissions of the policy owner's role, not the role of the user who ran the query. This helps protect hiding the policy from certain users. Users may run queries against tables protected by the RLS policy, without requiring access to the mapping tables that define the RLS policy.

Context functions such as current_role and i_nvoker role may be used in the policy expression. Current role may return the role that executed the query, whereas invoker role may be more useful in cases where the RLS-protected table is accessed through a view, in which case it returns the role that owns the view.

In data sharing scenarios, two RLS policies may be provided: one on the producer side and one on the consumer side. The producer's RLS policy may limit which rows are visible to each consumer. The consumer's RLS policy may determine row access restrictions for roles in the consumer's account.

Session parameters may be controlled for ensuring enforcement of the RLS policy. For example, time output format and timezone parameters may affect the results of a current_timestamp function. Under non-RLS conditions, these parameters may come from the current user's session. But for RLS-protected tables, these parameters may come from the account. This may prevent users from changing their session parameters in ways to circumvent the RLS policy. The timestamp-related functions, as described herein, may be applicable for data-sharing and non-data-sharing situations.

Figure 7:
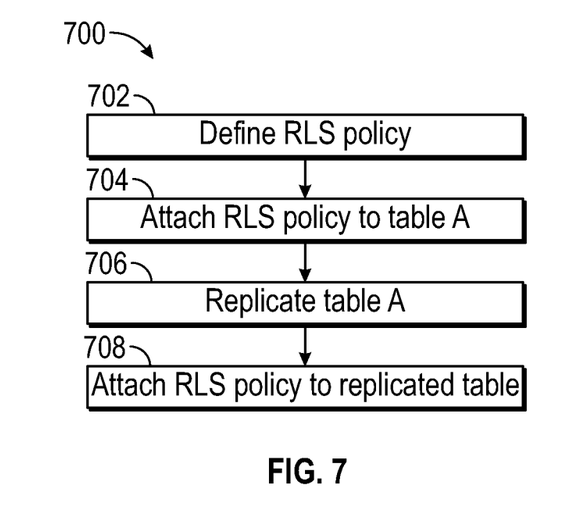
FIG. 7 shows a flow diagram of a method for replicating a table while maintaining a RLS policy, according to some example embodiments.

FIG. 7 shows a flow diagram of a method 700 for replicating a table while maintaining a RLS policy, according to some example embodiments. At operation 702, a RLS policy may be defined, as described herein. At operation 704, the RLS policy may be attached to Table A, as described herein. At operation 706, in response to a request to replicate (or clone), Table A may be replicated and stored as a new table, say Table Z. At operation 708, the RLS policy attached to Table A may also be replicated and automatically attached to the replicated Table Z. Thus, replicating a table may not provide a path to bypass the RLS policy.

RLS policies, as described herein, may be applied to historical data, too. For example, in "time travel" queries, historical rows may be passed into the RLS policy. However, any entities (e.g., mapping tables) referenced in the policy expression itself may be queried at the present time. This may ensure that changes in the mapping table have immediate effect.

Moreover, a table may have a RLS policy, as described herein, and column-masking policies applied to individual columns. Conceptually, the RLS policy may be applied first; columns passed to the RLS policy may not be masked.

Figure 8:
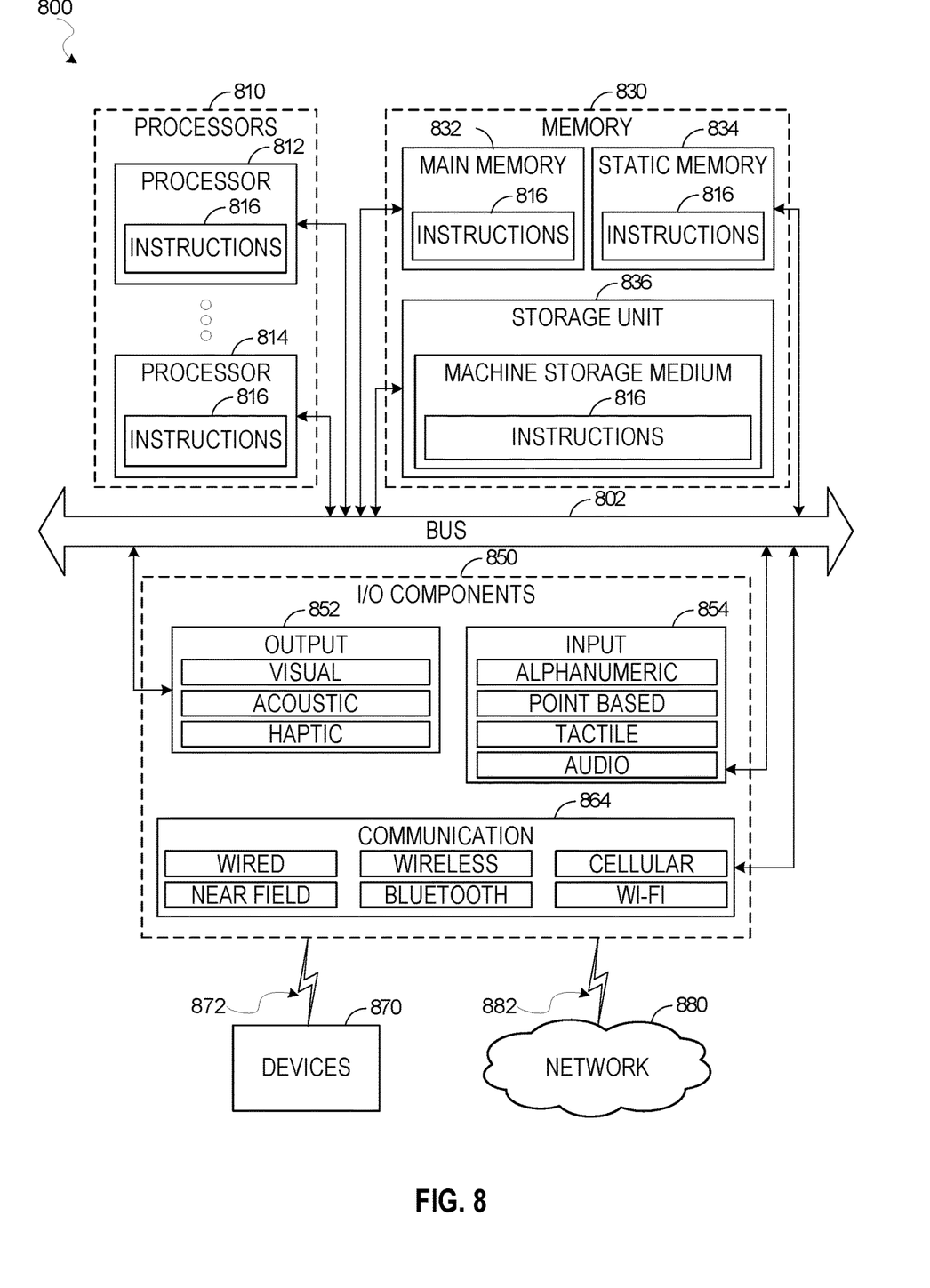
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implemented portions of the data flows described herein. In this way, the instructions 816 transform a general, non-programmed machine into a particular machine 800 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 110, the compute service manager 112, the execution platform 114, the access management system 118, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: defining, by at least one processor, a row level security policy independent of any table, the row level security policy including a Boolean-valued expression; attaching the row level security policy to a first table; receiving a command relating to the first table; creating a plan to execute the command, the plan including a set of operators; optimizing the set of operators; determining that execution of a first operator from the set of operators before a second operator relating to the row level security policy would reveal information restricted by the row level security policy; prioritizing the second operator relating to the row level security policy over the first operator from the set of operators; and executing the plan and generating a result to the command.

Example 2. The method of example 1, further comprising: attaching the row level security policy to a second table.

Example 3. The method of any of examples 1-2, wherein the row level security policy is defined by a first user with a first role.

Example 4. The method of any of examples 1-3, wherein the row level security policy is attached to the first table by a second user with a second role.

Example 5. The method of any of examples 1-4, wherein prioritizing the first operator over the second operator prevents disclosure of an error channel.

Example 6. The method of any of examples 1-5, wherein attaching the row level security policy to the first table includes designating one more columns in the first table for application of the row level security policy.

Example 7. The method of any of examples 1-6, wherein the row level security policy allows a user to update a row in manner that it is longer accessible to the user based on the row level security policy.

Example 8. The method of any of examples 1-7, wherein the row level security policy allows a user to insert a row, where the row not accessible by the user after insertion based on the row level security policy.

Example 9. The method of any of examples 1-8, wherein the row level security policy restricts a user from deleting a row not accessible by the user based on the row level security policy.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
   storing a table by a provider account in at least one data storage device;
   attaching a provider row level security policy to the table by a first user associated with the provider account, the provider row level security policy being independent of the table and including a Boolean-valued expression;
   sharing the table with the attached provider row level security policy with a consumer account, the provider row level security policy limiting at least one row from being accessible to the consumer account;
   attaching a consumer row level security policy to the shared table;
   receiving, from the consumer account, a query relating to the table;
   creating, by a compute service manager, a plan to execute the query, the plan including a set of operators;
   modifying, by the compute service manager, the plan based on the provider row level security policy and consumer row level security policy, the modified plan includes arranging a first operator over a second operator to not reveal information restricted by the provider row level security policy;
   dividing, by the compute service manager, the modified plan into multiple discrete tasks;
   assigning, by the compute service manager, each of the multiple discrete tasks to one or more execution nodes; and
   generating a result for the query based on execution of the assigned multiple discrete tasks.

2. The method of claim 1, wherein the at least one data storage device is decoupled from the one or more execution nodes.

3. The method of claim 1, wherein sharing the table includes the consumer account having access to the table without copying data in the table.

4. The method of claim 1, wherein arranging the first operator over the second operator prevents disclosure of an error channel.

5. The method of claim 1, wherein the query is executed without accessing a mapping table that defines the provider row level security policy.

6. The method of claim 5, wherein a policy expression of the provider row level security policy is evaluated using permission privilege of an owner role of the provider row level security policy.

7. The method of claim 1, wherein the consumer row level security policy restricting access based on roles in the consumer account.

8. A non-transitory machine-storage medium embodying instructions that, when executed by a machine, cause the machine to perform operations comprising:
   storing a table by a provider account in at least one data storage device;
   attaching a provider row level security policy to the table by a first user associated with the provider account, the provider row level security policy being independent of the table and including a Boolean-valued expression;
   sharing the table with the attached provider row level security policy with a consumer account, the provider row level security policy limiting at least one row from being accessible to the consumer account;
   attaching a consumer row level security policy to the shared table;
   receiving, from the consumer account, a query relating to the table;
   creating, by a compute service manager, a plan to execute the query, the plan including a set of operators;
   modifying, by the compute service manager, the plan based on the provider row level security policy and consumer row level security policy, the modified plan includes arranging a first operator over a second operator to not reveal information restricted by the provider row level security policy;
   dividing, by the compute service manager, the modified plan into multiple discrete tasks;
   assigning, by the compute service manager, each of the multiple discrete tasks to one or more execution nodes; and
   generating a result for the query based on execution of the assigned multiple discrete tasks.

9. The non-transitory machine-storage medium of claim 8, wherein the at least one data storage device is decoupled from the one or more execution nodes.

10. The non-transitory machine-storage medium of claim 8, wherein sharing the table includes the consumer account having access to the table without copying data in the table.

11. The non-transitory machine-storage medium of claim 8, wherein arranging the first operator over the second operator prevents disclosure of an error channel.

12. The non-transitory machine-storage medium of claim 8, wherein the query is executed without accessing a mapping table that defines the provider row level security policy.

13. The non-transitory machine-storage medium of claim 12, wherein a policy expression of the provider row level security policy is evaluated using permission privilege of an owner role of the provider row level security policy.

14. The non-transitory machine-storage medium of claim 8, wherein the consumer row level security policy restricting access based on roles in the consumer account.

15. A system comprising:
one or more processors of a machine; and
a memory storing instructions that, when executed by the one or more processors, cause the machine to perform operations comprising:
storing a table by a provider account in at least one data storage device;
attaching a provider row level security policy to the table by a first user associated with the provider account, the provider row level security policy being independent of the table and including a Boolean-valued expression;
sharing the table with the attached provider row level security policy with a consumer account, the provider row level security policy limiting at least one row from being accessible to the consumer account;
attaching a consumer row level security policy to the shared table;
receiving, from the consumer account, a query relating to the table;
creating, by a compute service manager, a plan to execute the query, the plan including a set of operators;
modifying, by the compute service manager, the plan based on the provider row level security policy and consumer row level security policy, the modified plan includes arranging a first operator over a second operator to not reveal information restricted by the provider row level security policy;
dividing, by the compute service manager, the modified plan into multiple discrete tasks;
assigning, by the compute service manager, each of the multiple discrete tasks to one or more execution nodes; and
generating a result for the query based on execution of the assigned multiple discrete tasks.

16. The system of claim 15, wherein the at least one data storage device is decoupled from the one or more execution nodes.

17. The system of claim 15, wherein sharing the table includes the consumer account having access to the table without copying data in the table.

18. The system of claim 15, wherein arranging the first operator over the second operator prevents disclosure of an error channel.

19. The system of claim 15, wherein the query is executed without accessing a mapping table that defines the provider row level security policy.

20. The system of claim 19, wherein a policy expression of the provider row level security policy is evaluated using permission privilege of an owner role of the provider row level security policy.

21. The system of claim 15, wherein the consumer row level security policy restricting access based on roles in the consumer account.

\* \* \* \* \*